United States Patent [19]

Ahl et al.

[11] Patent Number: 4,752,852
[45] Date of Patent: Jun. 21, 1988

[54] ELECTRONIC FUSE

[75] Inventors: Ulf P. L. Ahl, Johanneshov; Hans S. G. Lundström, Hägersten, both of Sweden

[73] Assignee: Telefonaktiebolaget LM Ericsson, Stockholm, Sweden

[21] Appl. No.: 2,707

[22] PCT Filed: Apr. 8, 1986

[86] PCT No.: PCT/SE86/00161
§ 371 Date: Dec. 5, 1986
§ 102(e) Date: Dec. 5, 1986

[87] PCT Pub. No.: WO86/06223
PCT Pub. Date: Oct. 23, 1986

[30] Foreign Application Priority Data

Apr. 12, 1985 [SE] Sweden ............................. 8501804

[51] Int. Cl.[4] .............................................. H02H 3/20
[52] U.S. Cl. ........................................ 361/58; 361/83; 361/91; 361/100; 363/49; 363/50

[58] Field of Search .................. 361/101, 100, 18, 58, 361/88-95, 98, 111, 29, 60, 99, 71-79, 83; 323/278, 901; 363/49, 50

[56] References Cited

U.S. PATENT DOCUMENTS 4,233,557 11/1980 Alberkrack ...................... 363/49 X Primary Examiner—A. D. Pellinen
Assistant Examiner—Todd E. DeBoer
Attorney, Agent, or Firm—Roberts, Spiecens and Cohen

[57] ABSTRACT

An electronic fuse is intended to be triggered should the current from a load (LA) exceed a predetermined value. The load current is restricted first by a switch in series with the load, the switch being kept in a closed or open state by pulses from a pulse length modulator (PB). The pulse length of the modulator is controlled by a sensing circuit (AK) such that when the load current exceeds the predetermined value, the circuit sends a control signal varying as the load current, so that the closing time of the switch (OM) decreases with increasing load current. After a practically contant time the switch is thereafter set to a permanently open state.

4 Claims, 2 Drawing Sheets 4,752,852

ELECTRONIC FUSE

FIELD OF THE INVENTION

The invention relates to an electronic fuse intended to be triggered should the current through a load exceed a predetermined value, the fuse containing current-sensing and current-limiting circuits as well as a time circuit, whereby the load current is first restricted and then interrupted entirely on exceeding the determined value.

BACKGROUND ART

An electronic fuse according to the above is described in SE-8201003-4. Two current paths are coupled in parallel in series with the load, one of the paths having low resistance and the other containing a current-limiting resistor. If the load current exceeds the predetermined value, it is limited first by the low-resistive current path being controlled to become non-conductive. After a fixed time determined by an RC dircuit the current is interrupted entirely by the second current path also becoming non-conductive.

SUMMARY OF THE INVENTION

An object of the present invention is to provide an electronic fuse of the above type kind give in the introduction, such that when the load current exceeds the predetermined value the fuse limits this current in a flexible manner to a value somewhat exceeding the predetermined value, and subseqently interrupts it entirely after a time determined by the time circuit. This is achieved by a controllable switch connected in series with the load current, and in response thereto is controlled to alternately conduct and interrupt this current.

Some of the advantages of the fuse in accordance with the present invention are that the voltage of the supply voltage source, which may be common for several loads, is not noticeably charged for shortcircuiting in one or more of these loads, that injurious transients are avoided and that the current shock arising on coupling in a capacitive load is restricted. The fuse may furthermore be readily reset after it has been triggered.

BRIEF DESCRIPTION OF DRAWING

The invention will now be described in detail with reference to the attached drawing in which.

BEST MODE FOR CARRYING OUT THE INVENTION

Figure 1:
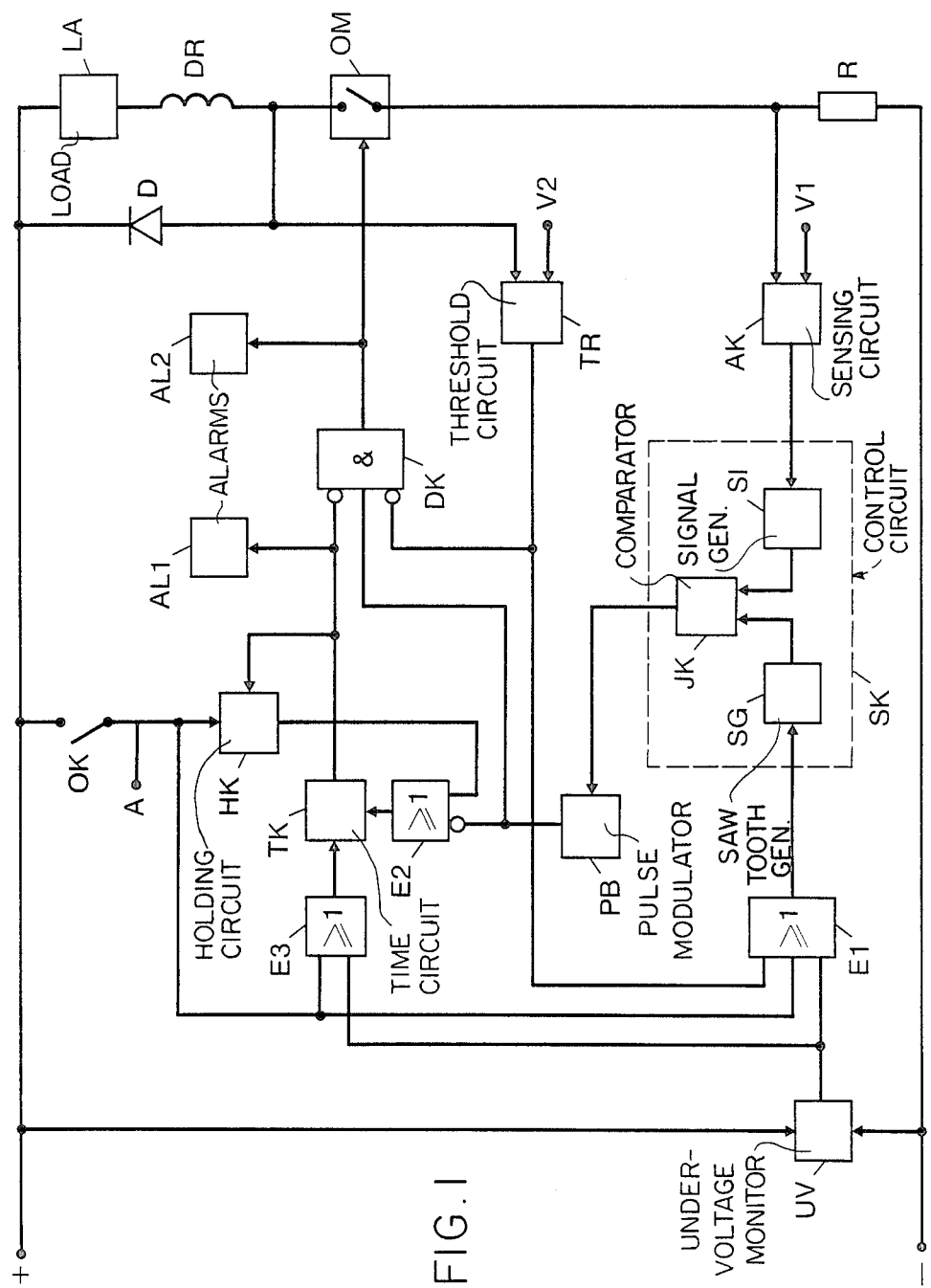
FIG. 1 is a block diagram of an electronic fuse in accordance with the invention.
Figure 2:
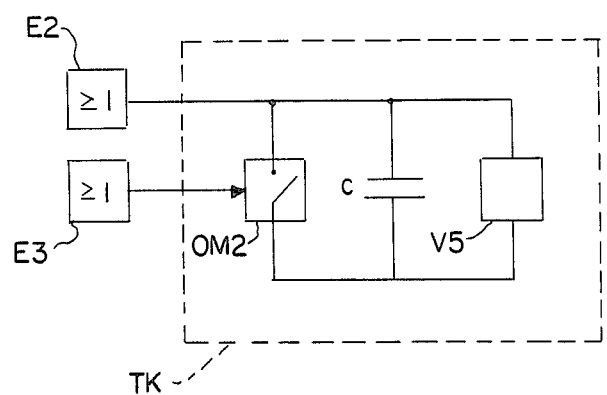
FIG. 2 shows a portion thereof in detail.

In the Figure there is shown a block diagram of an electronic fuse in accordance with the invention. A load LA, the current flow through which is to be monitored, is connected in a series circuit comprising a choke coil DR, a controllable switch OM and a current-sensing resistor R, and this series circuit is connected between the poles of a supply voltage source. The switch may comprise a power transistor and is adapted to be closed when a voltage corresponding to a logical One occurs at its control input.

The end of the resistor R facing towards the switch OM and a reference voltage V1 are respectively connected to a first and a second input of a sensing circuit AK. The latter is disposed for generating an output voltage responding to the difference between its input voltages, if the voltage at its first input exceeds the voltage at its second input. Otherwise the output is voltage zero. The resistor R and the reference voltage V1 are selected such that the voltage across the resistor is equal to V1 if the current through the load LA is equal to a predetermined value corresponding to the greatest acceptable load current. The circuit AK thus generates an output voltage which is zero if the load current falls below the predetermined value, and which responds to the difference between a greater load current and the predetermined value should a greater load current occur.

A control circuit denoted by SK has two inputs, of which the first is connected to the output of the sensing circuit AK and the second to the output of an OR gate E1. The control circuit is disposed to generate a voltage which increases when the voltage at its first input decreases and vice versa. The condition is, however, that it obtains a logic Zero on its second input. The voltage which is thus generated assumes a given maximum value for the input voltage zero and decreases towards zero for increased input voltage. If the control circuit SK obtains a logical One at its second input, there is generated instead the voltage zero volts as long as the One remains. When the One ceases, the voltage is successively increased to the value determined by the voltage at its first input.

The control circuit SK may consists of a saw-tooth generator SG and a signal generator SI, the outputs of which are connected to the inputs of a comparator circuit JK. The saw-tooth generator is disposed to generate the voltage zero when a logical One occurs at its input, and a voltage which successively increases from zero to a maximum value when a logical Zero occurs at its input, subsequent to which the voltage will be at the maximum value until a new One occurs at the input. The signal generator SI is disposed to give a high output signal for a low input signal, and for every increase of the input signal to give a decrease in the output signal. The comparator circuit JK has at its output a voltage corresponding to the voltage value which is lowest at its inputs.

The output of the control circuit SK is connected to a pulse length modulator PB, which generates pulses when the control circuit obtains a logical Zero at its second input, the length of these pulses being maximum when the control voltage from the sending circuit is zero, depending on that the load current falls below the predetermined value. The pulse length decreases in response to the difference between the current and the predetermined value for larger loads.

The pulse length modulator PB is connected via a drive circuit DK to the control input of the swtich OM. The drive circuit is symbolically denoted as an AND gate which is kept open for pulses from the modulator PB if voltage levels corresponding to logical Zeros occur at two negated, further inputs of the gate. The switch will thus be closed during the time for each pulse from the modulator PB. When the load current falls below the predetermined value, the switch will thus be closed the whole time, while when the current exceeds this value it will alternately conduct and interrupt this current in time with the pulses. When the switch is open the current is led back again to the load LA due to the energy stored in the choke DR via a diode D connected in parallel with the choke and load. The choke may be dispensed with if the load is inductive. The means are adapted such that an excessive load current will be limited to increase and decrease in time with the pulses about a value which only inconsiderably exceeds the predetermined value.

The pulse length modulator PB is also connected to a time circuit TK via an OR gate E2, the output of the time circuit being inter alia connected to a negated input on the drive circuit DK denoted as an AND gate. The time circt TK achieves that load currents exceeding the mentioned predetermined value are interrupted entirely after a time which is practically constant but which decreases somewhat with increasing load current. The interruption is achieved by chasing the voltage at the time circuit output from a logic Zero to a One after the mentioned time, whereby the pulses from the modulator PB are no longer passed to the switch OM. In principle, the time circuit comprises a capacitor C and a voltage-sensing circuit VS, in which the capacitor is charged during the times when the pulses from the modulator PB do not occur, i.e. when the switch OM is kept open. The voltage-sensing circuit VS generates an output signal corresponding to a logical One when the voltage over the capacitor has attained a given value. The capacitor charging time varies merely insignificantly with the load current, however.

The output of the time circuit TK is also connected to an input of a holding circuit HK, the output of which is connected to the time circuit input via the OR gate E2. The task of the holding circuit is to act on the time circuit TK after the output signal from the time circuit has been generated so that the output signal is retained until the holding circuit and time circuit have each obtained a control signal in the form of a logical One at their respective further inputs. The holding circuit HK may constitute, for example, a flip-flop, which is set to One when it obtains the output signal from the time circuit TK, whereby the capacitor in the time circuit is kept charged. When the output signal from the time circuit has been generated, the switch OM is thus reset to the off position, which is subsequently maintained by the holding circuit HK.

The fuse is reset by the mentioned control signal in the form of a logical One being applied to the further inputs on the holding circuit HK and time circuit TK. The control signal may, for example, stem from an outside voltage source at a point A, or from the voltage supply source, and in the latter case it is applied by a manually operable switch OK. The point A is connected to the time circuit via an OR gate E3 and is also connected to the control circuit SK via the OR gate E1. When the control signal occurs, the holding circuit HK is reset such as to no longer activate the time circuit TK, the time output voltage is changed from a logical One to a Zero. This may be achieved by the charge to the time circuit capacitor via the gate E2 ceasing, simultaneously as it is discharged due to the signal from the gate E3 to open switch $OM_2$. Since a One also occurs at the output of the gate E1, the pulse length modulator PB will generate pulses with a successively increasing pulse length on being restarted, whereby the load current will also be increased successively.

The fuse also includes threshold circuit TR. The inputs of circuit TR are connected to a connection point between the choke DR and the switch OM and to a second reference voltage V2. Its output is connected to an input of the drive circuit DK as well as to an input of the OR gate E1. The voltage V2 is selected such that the threshold circuit generates an output signal corresponding to a logical One in case the load current considerably exceeds the predetermined value according to the above, by such as a factor of two. This can occur, inter alia, for a short circuit, resulting in that the fuse is triggered immediately. By the threshold circuit TR being connected via the OR gate E1 to the control circuit SK, the fuse will, however, be in principle in the same state as restarting according to the above, when the load current has been interrupted consequential to an output signal from the threshold circuit. The fuse is thus reset automatically, the pulse length of the pulses controlling the switch OM increasing successively from zero. This is important in coupling in a capacitive load, since to start with, the load current can here have the same magnitude as a shortcircuiting current. If such a short circuit should continue, the current is interrupted permanently by the switch OM, due to the time circuit TK generating an output signal, subsequent to which the fuse must be reset by a control signal at A before it can conduct current once again.

In order, inter alia, to prevent total discharge of the system voltage supply source, the fuse is also provided with an undervoltage monitor UV, the output of which is connected to an input of each of the OR gates E1 and E3. The monitor generates a voltage corresponding to a logical One if the system voltage falls below a given minimum value. In such a case the switch OM is set to its open state since the pulses from the modulator PB cease. If the voltage once again attains it normal value the fuse is reset automatically, since the time circuit TK has not been able to be energized due to the signal from the gate E3 which controls switch $OM_2$ of time circuit TK. As with the setting after an excessive load current, the pulse length of the pulses from the modulator PB is increased successively from zero and upwards.

Alarm devices are denoted by AL1 and AL2, of which AL1 is energized when the switch OM is open as a result of an output signal from the time circuit TK being generated, and AL2 is always energized when the switch is open, irrespective of the reason.

The logical circuits in the illustrated embodiment may of course be arranged differently. They may also be replaced by analog circuits, which act on the remaining components of the fuse in principly the same way. Furthermore, the sensing circuit AK, control circuit SK and switch OM, for example, may be modified such that they have functions other than those apparent from above, but such that the switch is reset at the same time as in the illustrated embodiment.

What is claimed is:

1. An electronic fuse controlling current flow from a voltage supply through a load, said electronic fuse comprising current sensing circuit means for sensing current flow through a load controlled by the fuse, current limiting circuit means for limiting current flow through the load, a timing circuit connected to the current sensing circuit means and to the current limiting circuit means for first restricting the current flow through the load and then interrupting the current flow entirely when the current exceeds a predetermined value, said current limiting circuit means comprising a controllable switch connected in series with said load and the voltage supply, said current sensing circuit means being connected to said controllable switch to keep said switch in a continuously closed state when the current through the load does not exceed the predetermined value, said timing circuit producing pulses when the current through the load exceeds the predetermined value to open and close the switch, said current limiting circuit means causing said pulses produced by said timing circuit to cause degrees in the open state of the switch for increasing current through the load, a choke coil connected in series with the load and the switch, and a diode connected in parallel with the series connected load and to pass current choke in opposite direction to the current passing through the load.

2. An electronic fuse as claimed in claim 1 wherein said current sensing circuit means comprises a holding circuit, said switch having a control input, said timing circuit having an output connected to said switch control input and to said holding circuit such that when the current through the load exceeds the predetermined value a control signal is sent from the output of the timing circuit after a substantially constant period of time, said switch being set to its open state when the control signal occurs and remaining in this state until the fuse has been given a resetting signal.

3. An electronic fuse as claimed in claim 2 wherein said timing circuit includes a capacitor adapted for being charged when the switch is in open state, the control signal at the output of the timing circuit being sent when the voltage across the capacitor has attained a given value.

4. An electronic fuse as clained in claim 2 wherein said timing circuit includes a pulse modulator for generating said pulses, said current sensing circuit means including a control circuit means connected to the pulse modulator, said control circuit means having a resetting input, the control circuit means generating a control signal after occurrence of a resetting signal at said input therefor, said control signal changing successively from a given value such that said switch will be closed for time intervals increasing successively from zero to a value determined by the strength of the current through the load.

* * * * *